United States Patent
Harada et al.

(10) Patent No.: US 6,294,643 B1
(45) Date of Patent: Sep. 25, 2001

(54) AROMATIC POLYESTER AND MOLDED ARTICLE USING THE SAME

(75) Inventors: Hiroshi Harada, Minoo; Yoshifumi Yoshida, Toyonaka, both of (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 09/552,307

(22) Filed: Apr. 19, 2000

(30) Foreign Application Priority Data

Apr. 20, 1999 (JP) .................................................. 11-112109

(51) Int. Cl.$^7$ .................................................. C08G 64/00
(52) U.S. Cl. ........................ 528/196; 528/198; 528/271; 528/272
(58) Field of Search .................... 528/193, 194, 528/271, 272

(56) References Cited

U.S. PATENT DOCUMENTS

| | | | |
|---|---|---|---|
| 4,563,508 | 1/1986 | Cottis et al. | 525/444 |
| 4,603,190 | 7/1986 | Dicke et al. | 528/193 |
| 4,751,128 | 6/1988 | Portugall et al. | 528/193 |
| 4,757,128 | 7/1988 | Domb et al. | 528/271 |
| 5,278,278 | 1/1994 | Okamoto et al. | 528/190 |
| 5,767,223 | 6/1998 | Yamada et al. | 528/193 |

*Primary Examiner*—Terressa M. Boykin
(74) *Attorney, Agent, or Firm*—Sughrue, Mion, Zinn, Macpeak & Seas, PLLC

(57) ABSTRACT

An aromatic polyester having the following structural units (1) to (5) wherein the amount of the structural unit (1) is 40 to 70% based on the total of the all structural units, (2)/(3) is from 0.7 to 0.95, (4)/(5) is from 1.1 to 2.4, and {(2)+(3)}/{(4)+(5)} is from 0.9 to 1.1:

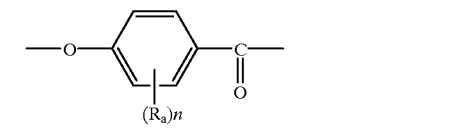

(1)

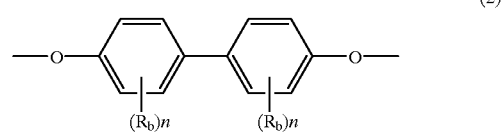

(2)

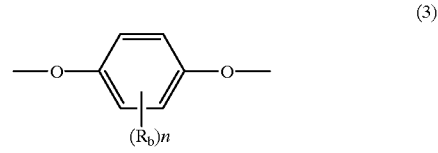

(3)

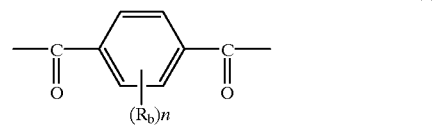

(4)

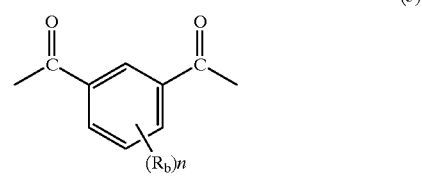

(5)

wherein Ra, Rb, RC, Rd, Re and Rf represents a lower alkyl group, lower alkoxy group, phenyl group or halogen atom, and n represents an integer from 0 to 3, is provided, and the molded article made of this polyester has excellent heat resistant and consequently is not easily deformed.

6 Claims, No Drawings

AROMATIC POLYESTER AND MOLDED ARTICLE USING THE SAME

BACKGROUND OF THE INVENTION

The present invention relates to an aromatic polyester having the following structural units (1) to (5) and a molded article using the aromatic polyester.

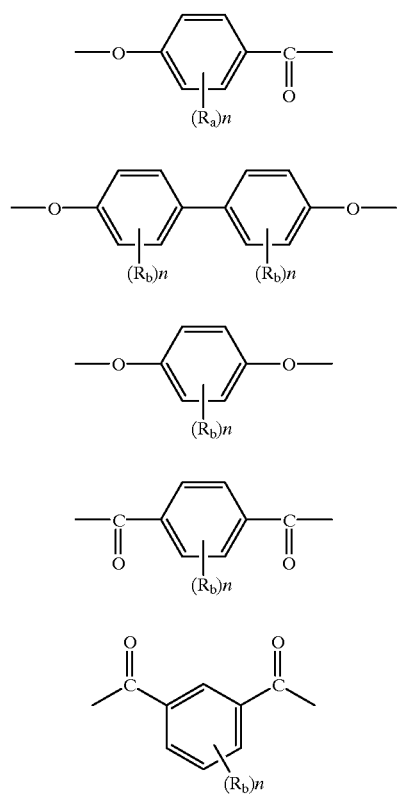

wherein Ra, Rb, Rc, Rd, Re and Rf each independently represents a lower alkyl group, lower alkoxy group, phenyl group or halogen atom, and n represents an integer from 0 to 3.

Conventionally, aromatic polyesters having the above-described structural units (1), (2), (4) and (5) have been known. Recently, aromatic polyester also having the structural unit (3) have been suggested. For example, an aromatic polyester has been disclosed in which the ratio of (2) to (3) (=molar ratio of (2) to (3), that is, ratio of number of unit (2) to number of unit (3) in the aromatic polyester. Hereinafter in this specification, the molar ratio of a unit to another unit is indicated by using "/". For example, the molar ratio of (2) to (3) is indicated by as (2)/(3)) is 1.0 and (4)/(5) is 2.33 (JP-A-63-57633).

However, the above-described aromatic polyester has problems that, when molded, the ratio of the molding contraction coefficient along the vertical direction (TD direction) to the flow to the molding contraction coefficient along the flow direction (MD direction), that is TD/MD ratio, is remarkably large, and deformations such as warping of molded articles and the like occur.

On the other hand, an aromatic polyester having excellent molding property at lower temperature is also disclosed in which $1 \leq (2)/(3) \leq 9$ and $1.86 \leq (4)/(5) \leq 4$ (JP-B-7-98859). In this publication, it is also disclosed that, when $(2)/(3) < 1$, namely, (3) is surplus as compared with (2), molding property of the aromatic polyester at lower temperature has remarkably lowered.

Further, an aromatic polyester having excellent molding property at lower temperature is also disclosed in which $1 \leq (2)/(3) \leq 9$ and $0.3 \leq (4)/(5) \leq 1$. It is also disclosed that, when $(2)/(3) < 1$, namely, (3) is surplus as compared with (2), molding property of the aromatic polyester at lower temperature has remarkably lowered (JP-A No. 10-95839).

SUMMARY OF THE INVENTION

Under such conditions, the present inventors have intensively studied to find an aromatic polyester having excellent molding property at lower temperature and giving excellent TD/MD ratio to the molded article. As the result, they have found that, even if (3) is surplus as compared with (2), a polyester in which (2)/(3) and (4)/(5) are in the specific ranges has unexpectedly excellent molding property, and TD/MD ratio of the molded article is remarkably excellent. The present invention has thus been completed.

The present invention provides an aromatic polyester having the following structural units (1) to (5) wherein the amount of the structural unit (1) is 40 to 70% based on the total of the all structural units, (2)/(3) is from 0.7 to 0.95, (4)/(5) is from 1.1 to 2.4, and $\{(2)+(3)\}/\{(4)+(5)\}$ is from 0.9 to 1.1.

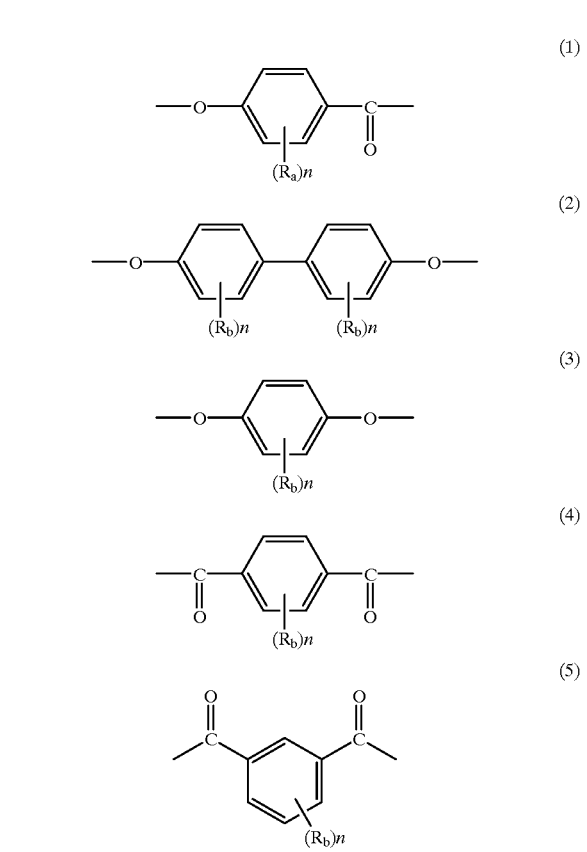

wherein Ra, Rb, Rc, Rd, Re and Rf each independently represents a lower alkyl group, lower alkoxy group, phenyl group or halogen atom, and n represents an integer from 0 to 3.

DETAILED DESCRIPTION OF THE PREFERRED EMBODIMENTS

In the aromatic polyester of the present invention, the structural unit (1) is usually derived from p-hydroxybenzoic acids represented by the following general formula (6)

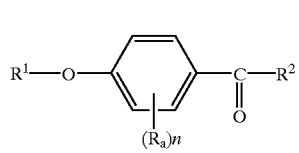

(6)

wherein, each Ra independently represents a lower alkyl group, lower alkoxy group, phenyl group or halogen atom; n represents an integer from 0 to 3; $R^1$ represents a hydrogen atom or lower acyl group; and $R^2$ represents a hydroxyl group, lower alkoxy group or halogen atom.

Examples of the lower alkyl group include a methyl group, ethyl group and propyl group. Examples of the lower alkoxy group include a methoxy group, ethoxy group, t-butoxy group and phenoxy group. Examples of the halogen atom include chlorine and bromine. n represents an integer from 0 to 3, and an unsubstituted group in which n is 0 is preferable.

Examples of the lower acyl group include an acetyl group, propionyl group and benzoyl group.

Typical examples of the p-hydroxybenzoic acids include p-hydroxybenzoic acid, methyl p-hydroxybenzoate, ethyl p-hydroxybenzoate. p-acetoxybenzoic acid, methyl p-acetoxybenzoate, ethyl p-acetoxybenzoate, propyl p-hydroxybenzoate, phenyl p-hydroxybenzoate and benzyl p-hydroxybenzoate. Among other, p-hydroxybenzoic acid and p-acetoxybenzoic acid are preferred.

The structural unit (2) is usually derived from 4,4'-dihydroxybiphenyls represented by the following general formula (7):

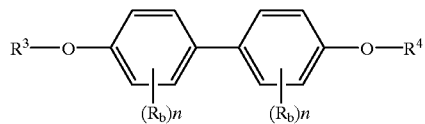

(7)

wherein Rb and Rc each independently represents a lower alkyl group, lower alkoxy group, phenyl group or halogen atom; n represents an integer from 0 to 3; and $R^3$ and $R^4$ each independently represents a hydrogen atom or lower acyl group.

Examples of the 4,4'-dihydroxybiphenyls include 4,4'-dihydroxybiphenyl and 4,4'-diacetoxybiphenyl.

The structural unit (3) is usually derived from 1,4-hydroquinones represented by the following general formula (8):

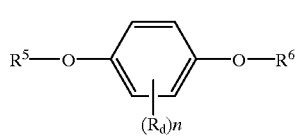

(8)

wherein each Rd independently represents a lower alkyl group, lower alkoxy group, phenyl group or halogen atom; n represents an integer from 0 to 3; and $R^5$ and $R^6$ each independently represents a hydrogen atom or lower acyl group. Typical examples of the 1,4-hydroquinones include 1,4-hydroquinone and 1,4-diacetoxybenzene.

The structural unit (4) is usually derived from terephthalic acids represented by the following general formula (9):

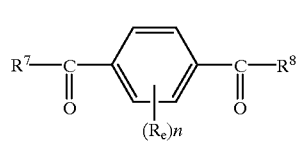

(9)

wherein each Re independently represents a lower alkyl group, lower alkoxy group, phenyl group or halogen atom; n represents an integer from 0 to 3; and $R^7$ and $R^8$ each independently represents a hydroxyl group, lower alkoxy group or halogen atom.

Typical examples of the terephthalic acids include terephthalic acid and dimethyl terephthalate.

The structural unit (5) is usually derived from isophthalic acids represented by the following general formula (10):

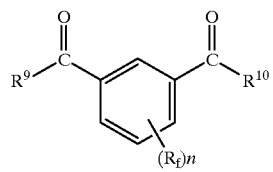

(10)

wherein, each Rf independently represents a lower alkyl group, lower alkoxy group, phenyl group or halogen atom; n represents an integer from 0 to 3; and $R^9$ and $R^{10}$ each independently represents a hydroxyl group, lower alkoxy group or halogen atom.

Typical examples of the isophthalic acids include isophthalic acid and dimethyl isophthalate.

In the aromatic polyester of the present invention, the content of the structural unit (1) is usually from about 40 to 70%, preferably from about 55 to 65% based on the total of the all structural units. In this specification, "%" indicating the content of a structural unit is molar basis, that is, based on the number of the structural unit, not based on the weight of the structural unit, unless otherwise mentioned.

When the content of the structural unit (1) is less than 40%, the molding property of the aromatic polyester tends to deteriorate, or the heat resistance of a molded article made of the polyester tends to deteriorate. When the content of the structural unit (1) exceeds 70%, the molding property of the aromatic polyester tends to deteriorate. Hence, the content of the structural unit (1) less than 40% and that over 70% are undesirable.

In the aromatic polyester of the present invention, (2)/(3) is usually about 0.7 to 0.95, preferably about 0.75 to 0.95, particularly preferably about 0.8 to 0.9.

When (2)/(3) is less than 0.7, the deflection temperature under load of a molded article made of the aromatic polyester tends to drop. When it exceeds 0.95, the heat resistance of the molded article tends to deteriorate. Hence, (2)/(3) less than 0.7 and that over 0.95 are undesirable.

In the aromatic polyester of the present invention, (4)/(5) is usually about 1.1 to 2.4, preferably about 1.1 to 2.0, particularly preferably about 1.2 to 1.8.

When (4)/(5) is less than 1.1, the heat resistance of a molded article made of the aromatic polyester tends to deteriorate, hence undesirable. When it exceeds 2.4, TD/MD ratio of the molding contraction coefficient of a molded article made of the aromatic polyester tends to increase, undesirably.

Herein, MD represents the molding contraction coefficient along the flow direction of the polyester in a molded article obtained from the aromatic polyester according to a method such as injection molding, blow molding, compression molding and the like. TD represents the molding contraction coefficient along the vertical direction to the flow of the polyester.

In the present invention, {(2)+(3)}/{(4)+(5)} is usually about 0.9 to 1.1.

The method for producing the aromatic polyester of the present invention is not particularly restricted. As an example of the method, Japanese Patent Publication No. 2838119 discloses a method in which a polycondensate of compounds (6) to (10) is taken out in a melted condition, then, is subjected to a solid phase polymerization. More specifically, a method is exemplified in which a compound having a hydroxyl group is acylated with an acylating agent such as acetic anhydride and the like, then polycondensed together with a carboxylic compound while distilling off the unreacted acylating agent, by-produced acids and the like; and, thereafter, the resulting slightly-polycondensed compound is recovered in melted condition, cooled to solidify, pulverized, and then subjected to a solid phase polymerization under reduced pressure or in an inert gas atmosphere at usually from about 240 to 370° C.

A catalyst may be used for accelerate the above-described polycondensation reaction. As the catalyst, metal oxides and organometal salts are exemplified. Specific examples thereof include oxides, acetates and oxalates of germanium, tin, titanium, antimony, cobalt and manganese.

The flow initiation temperature of the aromatic polyester in the present invention is usually from about 250 to 400° C., preferably from about 270 to 370° C.

The flow initiation temperature herein referred to is a temperature at which the melt viscosity is 48000 poise using a capillary type rheometer equipped with a dice having an internal diameter of I mm and a length of 10 mm and the aromatic polyester being extruded through a nozzle at a temperature raising speed of 4° C./minutes under a load of 100 kg/cm².

The molded article in the present invention is obtained by compounding the above-described aromatic polyester with inorganic fillers and the like, if necessary, and molding the mixture.

Examples of the inorganic fillers include glass fiber such as milled glass fiber and chopped glass fiber; inorganic fillers such as a glass bead, hollow glass sphere, glass powder, mica, talc, clay, silica, alumina, potassium titanate, wollastonite, calcium carbonate including heavy, light, colloidal and the like, magnesium carbonate, basic magnesium carbonate, sodium sulfate, calcium sulfate, barium sulfate, calcium sulfite, aluminum hydroxide, magnesium hydroxide, calcium hydroxide, calcium silicate, silica sand, silica stone, quartz, titanium oxide, zinc oxide, iron oxide graphite, molybdenum, asbestos, silica alumna fiber, alumina fiber, gypsum fiber, carbon fiber, carbon black, white carbon, diatomaceous earth, bentonite, cellite, shirasu and graphite; and metal or non-metal whiskers such as potassium titanate whisker, alumina whisker, aluminum borate whisker, silicon carbide whisker and silicon nitride whisker. Among them, glass fiber, glass powder, mica, talc, carbon fiber and the like are preferable.

Two or more kinds of above-described inorganic fillers may be combined and compounded into the molded article of the present invention. The amount of the inorganic filler to be compounded into the molded article is usually from about 0 to 400 parts by weight based on 100 parts by weight of the aromatic polyester.

Inorganic fillers subjected to a surface treatment may also be used. Examples of the surface treatment method include a method in which a surface treatment agent is adsorbed on the surface of an inorganic filler, and a method in which a surface treatment agent is added in kneading an aromatic polyester with an inorganic filler.

Examples of the surface treatment agent include reactive coupling agents such as silane-based coupling agents, titanate-based coupling agents and borane-based coupling agents, and lubricants such as higher fatty acids, higher fatty esters, higher fatty metal salts and fluorocarbon-based surfactants.

The molded article of the present invention may also contain additives, thermoplastic resins and the like. Examples of the additive include releasing improving agents such as fluorine resins and metal soaps, nucleating agents, antioxidants, stabilizers, plasticizers, lubricants, coloring inhibitors, coloring agents, ultraviolet ray absorbers, antistatic agents and flame retardants.

Examples of the thermoplastic resin include polycarbonate resin, polyamide resins, polysulfone resins, polyphenylene sulfide resins, polyphenylene ether resins, polyether ketone resins and polyether imide resins.

As the method for producing a molded article, following methods (a), (b), (c) and (d) are exemplified.

(a) Raw materials such as an aromatic polyester, an inorganic filler, an additive and the like are put into a kneader such as a single screw extruder, twin screw extruder, banbury mixer, roll, brabender, kneader and the like, then, melt-kneaded. The melt-kneaded product is fed into a molding machine such as an extrusion molding machine, injection molding machine, compression molding machine, blow molding machine and the like to conduct molding.

(b) Raw materials are pre-mixed using a mortar, henschell mixer, ball mill, ribbon blender and the like. Then, melt-kneading and molding are conducted as in (a).

(c) Raw materials are added into a reaction vessel and mixed.

(d) Raw materials are fed into a molding machine, and molded while mixing in melted condition.

The molded article of the present invention can be molded into various forms including fiber, film or the like.

Due to its excellent molding property, mechanical property, electrical property, chemical resistance, heat resistance, oil resistance and low TD/MD ratio, it can be applied to mechanical parts such as gears, bearings and motor parts, electric and electronic parts such as switches, coil bobbins, relays, connectors and sockets, business and information appliance parts such as printers, copying machines, facsimiles, video decks, video cameras, floppy disk drives, hard disk drives, CD-ROM drives and photomagnetic disk drives, semiconductor production process-related parts such as IC trays and wafer carriers, cooking appliances such as microwave cocking pans and heat resistant table wares for oven, large scale molder articles and molded articles having complicated forms, and the like.

The molded article of the present invention can be molded into films or sheets and can be used as parts for displays, electric insulation films, films for flexible circuit board, wrapping films, films for recording medium, and the like.

Moreover, the molded articles molded in the form of fibers such as continuous fibers, short fibers and pulp can be used as clothes, heat resistant insulation material, reinforcing materials for FRP, rubber reinforcing materials, ropes, cables, non-woven cloth and the like.

The following examples further illustrate the present invention in more detail, but do not limit the scope of the invention. "Parts" in the examples and comparative examples is weight basis unless otherwise mentioned.

EXAMPLE 1

Production of an Aromatic Polyester

Into a vessel equipped with a reflux condenser, thermometer, nitroge-introducing tube and stirring rod were charged 928 parts (molar ratio: 6.72) of p-hydroxybenzoic acid, 224 parts (molar ratio: 1.20) of 4,4'-dihydroxybiphenyl, 159 parts (molar ratio: 1.44) of hydroquinone, 309 parts (molar ratio: 1.86) of terephthalic acid, 130 parts (molar ratio:

0.78) of isophthalic acid and 1348 parts (molar ratio: 13.2) of acetic anhydride. Then, the mixture was heated to about 140° C., and stirred for 3 hours under reflux condition. Thereafter, acetic acid was distilled off while heating up to about 320° C., and the mixture was further kept at about 320° C. for 1 hour to obtain 1530 parts of a prepolymer.

The resulted prepolymer was cooled, then, ground by a grinder. Subsequently, it was put in a hot air circulation type oven, and the gas phase temperature in the oven was raised to 250° C. under nitrogen atmosphere. Further, the gas phase temperature was raised from 250° C. to 280° C. in 5 hours, then, kept at 280° C. for 3 hours to obtain 1525 parts of a polyester having a flow initiation temperature of 315° C.

Production of Molded Article 600 parts of the aromatic polyester obtained above and 400 parts of milled glass fiber (manufactured by Central Glass Co., Ltd, EFH75-01) were mixed by a henshell mixer, and granulated using a twin screw extruder (manufactured by Ikegai Corp., type PCM-30) at a cylinder temperature of 340° C. to obtain pellet.

The above-described pellet was dried at 120° C. for 3 hours, then, injection-molded using an injection molding machine (manufactured by Nissei Plastic Industrial Co., Ltd., PS40E5ASE) at a cylinder temperature of 340° C. and a mold temperature of 130° C. to obtain a test piece of 12.7 mm×6.4 mm×127 mm.

EXAMPLE 2

The same procedure, Production of an aromatic polyester and Production of molded article, was conducted as in Example 1 except that the charged ratio of p-hydroxybenzoic acid, 4,4'-dihydroxybiphenyl, hydroquinone, terephthalic acid and isophthalic acid were changed as shown in Table 1, the amount of the aromatic polyester was changed to 700 parts from 600 parts, and 300 parts of chopped glass fiber (manufactured by Asahi Fiber Glass K.K., CS03JAPx-1) was used in place of 400 parts of milled glass fiber.

EXAMPLE 3–4 AND COMPARATIVE EXAMPLES 1–5

The same procedure, Production of an aromatic polyester and Production of molded article, was conducted as in Example 1 except that the charged ratio of p-hydroxybenzoic acid, 4,4'-dihydroxybiphenyl, hydroquinone, terephthalic acid and isophthalic acid were changed as shown in Table 1.

The results of Examples 1–4 and Comparative examples 1–5 are shown in Table 1.

In Table 1, the compounds used are indicated by numbers. The number corresponding to each compound is shown below.

(1) p-Hydroxybenzoic acid
(2) 4,4'-dihydroxybiphenyl
(3) Hydroquinone
(4) Terephthalic acid
(5) Isophthalic acid Physical properties of molded articles obtained in Examples 1–4 and Comparative examples 1–5 are also shown in Table 1.

Measuring Method

Physical properties shown in Table 1 were measured according to the following methods.

Molding Property

The test piece obtained in Examples 1–4 and Comparative examples 1–5, production of a molded article, was injection-molded. If the resin was filled in the mold cavity and the appearance of the molded article were good, the molding property was judged as good ○, and in other cases, the molding property was judged as poor (X).

Deflection Temperature Under Load

The above-described test piece was subjected to the procedure according to ASTM D-648 under a pressure of 18.6 kg/cm$^2$ and a temperature raising speed of 2° C./min.

TD/MD Ratio

A mold having a cavity of 64×64×3 mm and a gate of 64×1 mm at one edge thereof was used. Injection molding was conducted under the same conditions as in the above-described production of molded article except for using the mold.

The resulted molded article was left for 24 hours or more under an atmosphere of 23° C. and a relative humidity of 50%, then, the edge length of the molded article along vertical direction to the gate (MD direction; flow direction of polyester) was measured, and the molding contraction coefficient represented by (64 mm—edge length of molded article along MD direction, mm)/64 mm was called MD. In the similar manner, the edge length of the molded article along the same direction as the gate (TD direction; vertical direction to flow direction of polyester) was measured, and the molding contraction coefficient represented by (64 mm—edge length of molded article along TD direction, mm)/64 mm was called TD, and TD/MD ratio was calculated.

TABLE 1

| | Example | | | | Comparative example | | | | |
|---|---|---|---|---|---|---|---|---|---|
| | 1 | 2 | 3 | 4 | 1 | 2 | 3 | 4 | 5 |
| (1) ratio*1 | 6.72 | 6.72 | 7.20 | 7.68 | 6.72 | 6.72 | 6.72 | 6.72 | 6.72 |
| *2 | 56 | 56 | 60 | 64 | 56 | 56 | 56 | 56 | 56 |
| (2) ratio*1 | 1.20 | 1.20 | 1.08 | 0.96 | 1.32 | 1.20 | 1.32 | 0.82 | 1.08 |
| (3) ratio*1 | 1.44 | 1.44 | 1.32 | 1.20 | 1.32 | 1.44 | 1.32 | 1.82 | 1.56 |
| (4) ratio*1 | 1.86 | 1.56 | 1.32 | 1.32 | 1.44 | 1.25 | 1.86 | 1.56 | 1.44 |
| (5) ratio*1 | 0.78 | 1.08 | 1.08 | 0.84 | 1.20 | 1.39 | 0.78 | 1.08 | 1.20 |
| (2)/(3) | 0.83 | 0.83 | 0.82 | 0.80 | 1.00 | 0.83 | 1.00 | 0.45 | 0.69 |
| (4)/(5) | 2.38 | 1.44 | 1.22 | 1.57 | 1.20 | 0.90 | 2.38 | 1.44 | 1.20 |
| Molding property | ○ | ○ | ○ | ○ | ○ | ○ | ○ | X | ○ |
| TD/MD ratio | 8.15 | 4.85 | 5.42 | 4.98 | 3.95 | — | 9.55 | — | 4.95 |
| Deflection temperature under load (° C.) | 273 | 254 | 250 | 279 | 226 | 222 | 263 | — | 237 |

Ratio*1: Charged molar ratio of each compound
*2: Contents of p-hydroxybenzoic acid (mol %)

The aromatic polyester of the present invention has excellent molding property. Further, a molded article made of this polyester has excellent heat resistant and consequently is not easily deformed. Therefore, it can be applied to molded articles having complicated forms, large scale molded articles, electric and electronic parts, precision instruments, and the like.

What is claimed is:

1. An aromatic polyester having the following structural units (1) to (5) wherein the amount of the structural unit (1) is 40 to 70% based on the total of the all structural units, (2)/(3) is from 0.7 to 0.95, (4)/(5) is from 1.1 to 2.0, and $\{(2)+(3)\}/\{(4)+(5)\}$ is from 0.9 to 1.1:

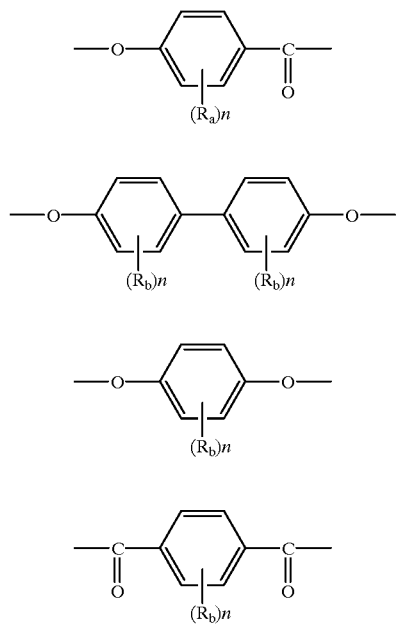

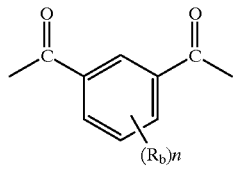

wherein Ra, Rb, Rc, Rd, Re and Rf each independently represents a lower alkyl group, lower alkoxy group, phenyl group or halogen atom, and n represents an integer from 0 to 3.

2. The aromatic polyester according to claim 1 wherein (2)/(3) is 0.8 to 0.9 and (4)/(5) is about 1.2 to 1.8.

3. The aromatic polyester according to claim 1 wherein each structural units (1) to (5) are derived from the following compounds represented by the following general formulae (6) to (10), respectively:

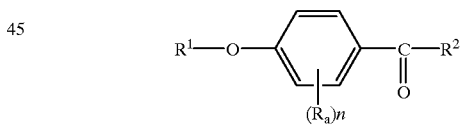

wherein, each Ra independently represents a lower alkyl group, lower alkoxy group, phenyl group or halogen atom; n represents an integer from 0 to 3; $R^1$ represents a hydrogen atom or lower acyl group; and $R^2$ represents a hydroxyl group, lower alkoxy a group or halogen atom;

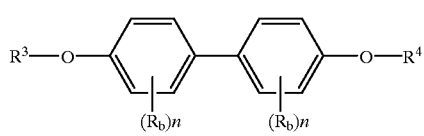

wherein Rb and Rc each independently represents a lower alkyl group, lower alkoxy group, phenyl group or halogen atom; n represents an integer from 0 to 3; and $R^3$ and $R^4$ each independently represents a hydrogen atom or lower acyl group;

(8)

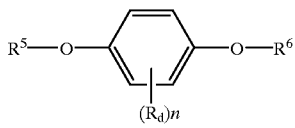

wherein each Rd independently represents a lower alkyl group, lower alkoxy group, phenyl group or halogen atom; n represents an integer from 0 to 3; and $R^5$ and $R^6$ each independently represents a hydrogen atom or lower acyl group;

(9)

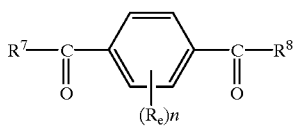

wherein each Re independently represents a lower alkyl group, lower alkoxy group, phenyl group or halogen atom; n represents an integer from 0 to 3; and $R^7$ and $R^8$ each independently represents a hydroxyl group, lower alkoxy group or halogen atom; and (10)

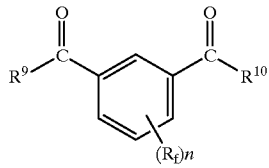

wherein each Rf independently a lower alkyl group, lower alkoxy group, phenyl group or halogen atom; n represents an integer from 0 to 3; and $R^9$ and $R^{10}$ each independently represents a hydroxyl group, lower alkoxy group or halogen atom.

4. The aromatic polyester according to claim 3 wherein n=0, $R^1$, $R^3$, $R^4$, $R^5$ and $R^6$ each independently represent a hydrogen atom or an acetyl group, and $R^2$, $R^7$, $R^8$, $R^9$ and $R^{10}$ represent a hydroxyl group.

5. A method for producing an aromatic polyester according to claim 2, which comprises a polycondensation of the compounds represented by the formulae (6) to (10).

6. A molded article obtained by compounding 100 parts by weight of the aromatic polyester according to claim 1 and about 0 to 400 parts by weight of an inorganic filler.

* * * * *